(12) United States Patent
Griffin

(10) Patent No.: US 10,963,010 B1
(45) Date of Patent: Mar. 30, 2021

(54) LIGHT SHADE AND PRIVACY SHADE FOR ELECTRONIC DEVICE SCREENS

(71) Applicant: Alexander Benedict Griffin, Austin, TX (US)

(72) Inventor: Alexander Benedict Griffin, Austin, TX (US)

( * ) Notice: Subject to any disclaimer, the term of this patent is extended or adjusted under 35 U.S.C. 154(b) by 0 days.

(21) Appl. No.: 17/030,114

(22) Filed: Sep. 23, 2020

Related U.S. Application Data

(63) Continuation-in-part of application No. 29/748,179, filed on Aug. 27, 2020.

(51) Int. Cl.
  *G02B 27/04* (2006.01)
  *G02B 5/20* (2006.01)
  *G06F 1/16* (2006.01)

(52) U.S. Cl.
  CPC ............ *G06F 1/1632* (2013.01); *G02B 5/20* (2013.01); *G02B 27/04* (2013.01); *G06F 1/1603* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 4,863,242 A | * | 9/1989 | Correa | G06F 1/1603 359/601 |
| 5,121,253 A | * | 6/1992 | Waintroob | H04N 5/65 348/834 |
| 5,237,453 A | * | 8/1993 | Jones | G02B 5/00 348/842 |
| 5,243,463 A | * | 9/1993 | Waintroob | H04N 5/65 348/E5.131 |
| 5,589,985 A | * | 12/1996 | Heller | G06F 1/1603 348/842 |
| 5,717,566 A | * | 2/1998 | Tao | G06F 1/1603 348/834 |
| 5,769,378 A | * | 6/1998 | Correa | G06F 1/1603 248/442.2 |
| 5,877,896 A | * | 3/1999 | Gremban | G06F 1/1603 348/842 |
| 5,900,979 A | * | 5/1999 | Heller | G06F 1/1603 348/E5.131 |
| 6,024,337 A | * | 2/2000 | Correa | G06F 1/1603 248/442.2 |
| 6,046,754 A | * | 4/2000 | Stanek | G06F 1/1603 345/169 |

(Continued)

*Primary Examiner* — Lisa Lea-Edmonds

(57) ABSTRACT

A foldable light shade and privacy shade visor for electronic device screens, particularly for use on laptops, electronic tablets and devices. The light and privacy shade is constructed of three semi-rigid panels with four molded plastic and rubber clips integrated into its surface. The areas between the three panels form flexible hinges allowing the light and privacy shade to fold open when in use and fold flat for carrying. The integrated plastic and rubber clips are used to attach the visor to the edges of the device screen securely. The light and privacy shade allows the electronic device to be used in direct sunlight, artificial light and ambient light by preventing light rays and glare from diminishing the view of the screen, while also preventing the device from overheating in the warmth generated by intense light, and providing privacy by shielding the contents of the screen from the view of third parties.

21 Claims, 18 Drawing Sheets

(56) References Cited

U.S. PATENT DOCUMENTS

| | | | | |
|---|---|---|---|---|
| 6,065,841 A * | 5/2000 | Heller | G06F 1/1603 | 348/842 |
| 6,084,711 A * | 7/2000 | Duff | G06F 1/1603 | 348/842 |
| 6,144,418 A * | 11/2000 | Kappel | G02B 27/027 | 348/834 |
| 6,353,531 B1 * | 3/2002 | Howell | G06F 1/1601 | 345/102 |
| 6,356,439 B1 * | 3/2002 | Schmidt | G06F 1/1603 | 135/117 |
| 6,839,227 B1 * | 1/2005 | Correa | G06F 1/1603 | 248/457 |
| 7,134,758 B1 * | 11/2006 | Baker | G06F 1/1603 | 359/601 |
| 7,304,839 B1 * | 12/2007 | Burns | G06F 1/1601 | 108/38 |
| 7,505,256 B2 * | 3/2009 | Boudreau | G06F 1/1603 | 361/679.27 |
| 7,508,657 B1 * | 3/2009 | Smith | G06F 1/1601 | 361/679.24 |
| 7,611,252 B1 * | 11/2009 | Lin | G06F 1/1603 | 359/601 |
| 8,405,908 B2 * | 3/2013 | Phillips | G06F 1/1603 | 359/599 |
| 9,310,615 B2 * | 4/2016 | Allen | G02B 27/0018 | |
| 9,752,381 B2 * | 9/2017 | Adib | G06F 1/1637 | |
| 10,379,572 B2 * | 8/2019 | Jacobs | G06F 1/1628 | |
| 2003/0231399 A1 * | 12/2003 | Leitao | G02B 27/04 | 359/614 |
| 2006/0279916 A1 * | 12/2006 | Boudreau | G06F 1/1603 | 361/679.26 |
| 2009/0268300 A1 * | 10/2009 | Dai | G06F 1/1603 | 359/601 |
| 2010/0026916 A1 * | 2/2010 | Lin | G06F 1/1603 | 348/842 |
| 2011/0141571 A1 * | 6/2011 | Allen | G06F 1/1603 | 359/609 |
| 2013/0148204 A1 * | 6/2013 | Allen | G06F 1/1637 | 359/601 |
| 2013/0250423 A1 * | 9/2013 | Trantham | G02B 27/04 | 359/601 |
| 2013/0265643 A1 * | 10/2013 | Armstrong | G02B 27/00 | 359/601 |
| 2013/0265644 A1 * | 10/2013 | Armstrong | G06F 1/1637 | 359/601 |
| 2013/0341233 A1 * | 12/2013 | Dow | A45C 11/00 | 206/521 |
| 2014/0375901 A1 * | 12/2014 | Stockett | H04N 5/64 | 348/838 |
| 2017/0300086 A1 * | 10/2017 | Blattel | G06F 1/1603 | |
| 2019/0072996 A1 * | 3/2019 | Pickens | G06F 1/1603 | |
| 2020/0033918 A1 * | 1/2020 | Akalou | G06F 1/1603 | |

* cited by examiner

LIGHT SHADE AND PRIVACY SHADE FOR ELECTRONIC DEVICE SCREENS

FIELD OF THE INVENTION

The invention relates to electronic device display screens, and more particularly to a light and privacy shade visor for laptops, tablets and other electronic devices with display screens, that facilitate viewing the display screens in bright light by removing glare, sunlight and heat generated from intense light.

BACKGROUND OF THE INVENTION

In today's digitally connected world, we are constantly using our electronic devices (smart phones, laptops, tablets and gaming devices) in all areas of our lives and in all sorts of locations, indoors and outdoors. As most electronic device screens today use emitted light technology such as LED displays, any use of these display screens when used outdoors must compete with the intense light from the sun. Usually such display screens are not powerful enough to contend with sunlight, and therefore the clarity of the screen contents is diminished in sunlight and ambient light requiring the use of a shade to shield the device from the effects of the sun. Not only is direct sunlight, artificial light and ambient light an issue when viewing electronic device display screens, but the heat generated by the sun also causes electronic devices to overheat quickly and to stop working. In most cases, extreme temperatures will cause electronic devices such as tablets and laptops to shut down and become unusable until their temperature is restored to normal. Finally, privacy often is a concern, especially in crowded spaces or under conditions where there is foot traffic past an electronic device user.

While make-shift solutions could work (such as using an umbrella, or a cardboard box) there is a need for a more professional, more compact, and superior solution which can easily be transported and folded flat, which withstands extreme heat, and which attaches and detaches to a wide variety of screens securely, easily and quickly.

One example of a conventional device shade is illustrated in U.S. D790,551, which shows an ornamental design for a laptop cover that uses pieces of elastic to attach to a laptop. The design is problematic for three reasons. Firstly, the elastic is cumbersome and difficult to attach to, and detach from, the laptop screen. Secondly, it does not provide a secure and stable bond with the screen edge. Lastly, the elastic covers over the full length of the screen therefore blocking the view of important apps and files displayed on the device screen. The design uses eleven panels, including a panel covering the entire base of the laptop, which is unduly complex and costly.

SUMMARY OF THE INVENTION

The light and privacy shade structure that is the subject of the present application shields electronic devices such as laptops, electronic tablets and other electronic devices, and their screens, from direct light, artificial light and ambient light and from the heat created by the sun. The light and privacy shade uses only three panels (left side, right side and top side of the screen) with as few as two, preferably four screen clips made from plastic and rubber which attach each of the panels quickly and securely to the edges of the screen, without obscuring any areas of the usable screen space. The light and privacy shade is made of a lightweight material and uses few parts. The shape and size of the light and privacy shade shields more sunlight than the prior sun shade designs, by providing a larger surface area to block the sun. The light and privacy shade is lightweight, and comprises panels that are made of rigid, semi-rigid or even flexible materials, the latter being supported in a frame, and flexible hinge portions that join adjacent panels and allow the shade to fold flat for transportation and optimum storage, and fold open with the left and right side panels at 90° angles to a central panel, forming an inverted 'U' shape.

The light and privacy shade structure uses screen clips that are constructed with a plastic base and opposing plastic and rubber walls affixed to the base. An opening between the opposed walls being sized so that the clip is easily secured onto the screen edge by pushing the screen edge into the opening between the opposed walls, yet can be easily detached from the screen when required by pulling the screen edge out from between the opposed walls. A range of flexibility in the walls of the screen clips provides a sprung pincer movement allowing the clips to attach to screens of varying thickness. The screen clips allow the screen shade to be attached and detached quickly and easily, without damaging the screen, with no need for any other attaching materials such as elastic, Velcro® hook & loop, or spring metal, all of which are inferior in their practical application.

DETAILED DESCRIPTION OF THE PREFERRED EMBODIMENT

Referring now in detail to the drawings, a light and privacy shade device for electronic devices such as laptops is illustrated.

Figure 1:
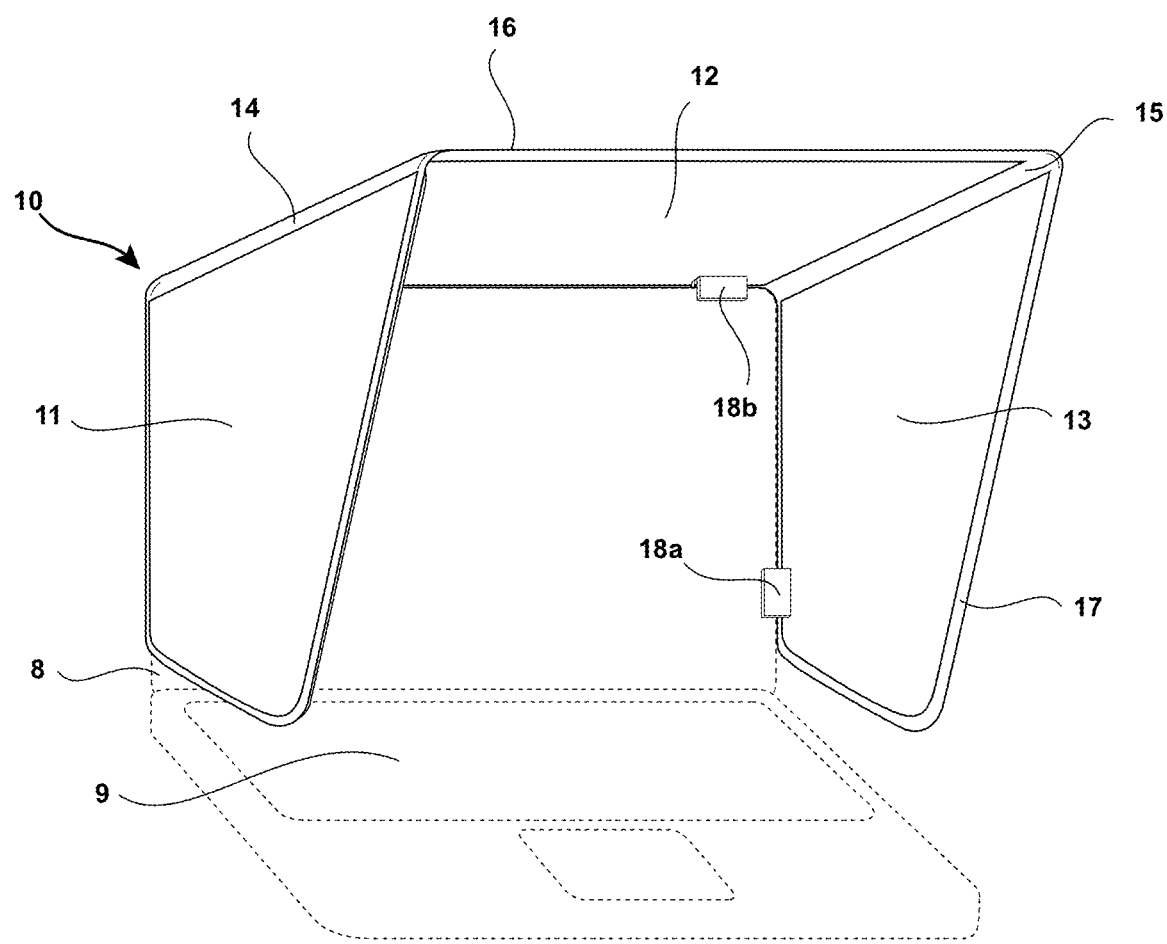
FIG. 1 is a perspective view of the light and privacy shade that is the subject of the present invention, attached to a laptop computer screen.

FIG. 1 is a three-dimensional perspective view showing the light and privacy shade 10 attached to a screen 8 of a laptop 9. In an operative position, the left side panel 11 and right side panel 13 are angled at 90° from the horizontal, while the middle panel 12 sits horizontally across the top of the device screen, thus forming an inverted 'U' shape which shields the device from sunlight, artificial light, ambient light, and heat from the sun, while providing privacy from third party viewing by shielding the contents of the screen. A hinge portion 14 is formed between one side edge of panel 11, serving as a junction side of panel 11, and one side edge of the middle panel 12, serving as one of two junction sides of panel 12. A hinge portion 15 is also formed between one side edge of panel 13, serving as a junction side of panel 13, to an opposite side edge of middle panel 12, serving as the second of two junction sides of panel 12. The hinge portions 14 and 15 permit the inverted "U" shape to be achieved by the three panels. Preferably, the junction side of each panel is substantially orthogonal to the securing side of each panel that couples to a side of the screen 8. One or more of the surfaces of panels 11, 12 and 13, outer surface 16 of panel 12 or the inner surface 17 of panel 13, for example, may be decorated with a decorative element such as a logo, illustration, pattern and branding design using embossing and printing techniques.

Figure 2:
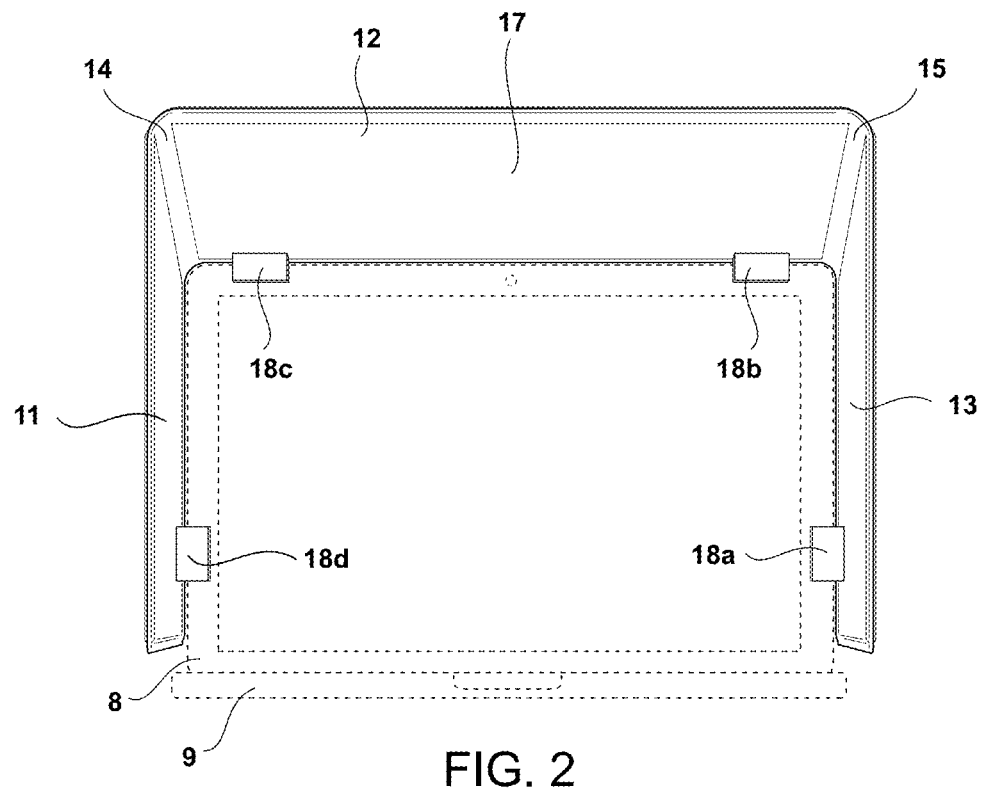
FIG. 2 is a front-facing view of the light and privacy shade attached to a laptop computer screen.

FIG. 2 shows a front view of a preferred embodiment of the light and privacy shade 10, with the left side panel 11, the middle/top side panel 12 and the right side panel 13 attached to the screen 8 of a laptop device 9 using the screen clips 18a, 18b, 18c and 18d. When panels 11 and 13 are folded at 90° angles to panel 12, using the left hinge portion 14 and right hinge portion 15, and are attached to the sides of a screen 8 of an electronic device 9, the preferred-size of the light and privacy shade 10 is W 12.5× H 9.6× D 9.6 inches for a thirteen inch screen size, and W 14× H 10.6× D 10.6 inches for a fifteen inch screen size. As would be understood by those skilled in the art, there may be a variety of other sizes for the light and privacy shade 10, adaptable for providing protection for smaller and larger device screens. For example, a smaller version that is approximately W 3× H 6× D 3 inches when folded ready for attaching can be used on smart phones, while a larger version that is W 28× H 16× D 16 inches when folded ready for attaching can be applied to 32 inch television displays. These dimensions may be adjusted for smaller or larger display screens.

Figure 3:
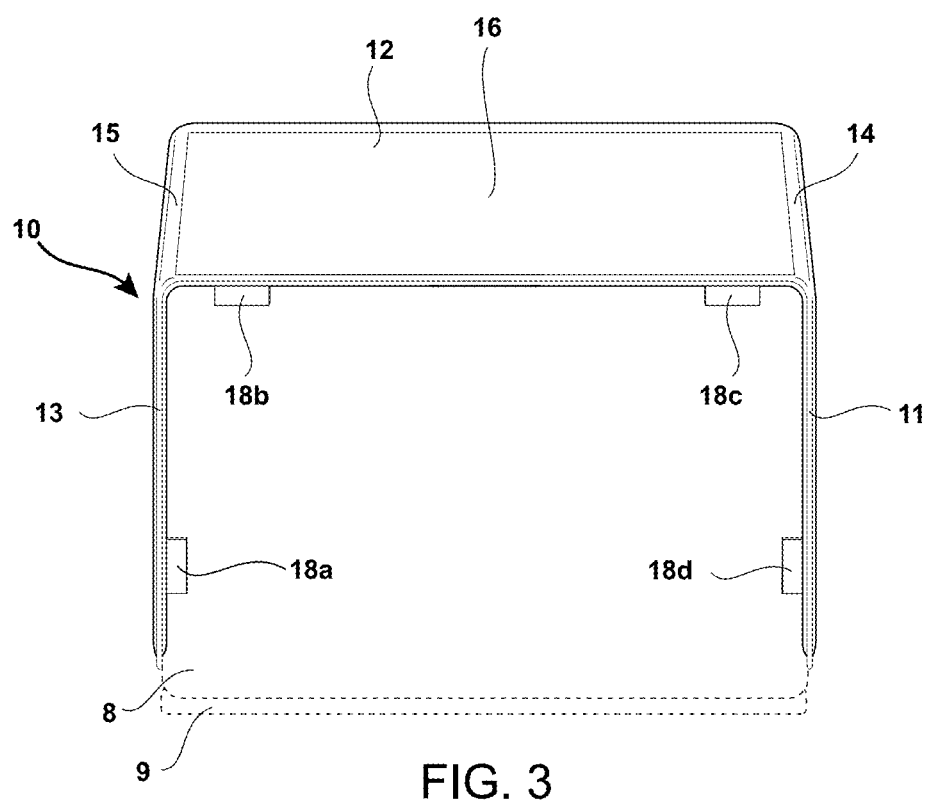
FIG. 3 is a rear-racing view of the light and privacy shade attached to a laptop computer screen.

FIG. 3 shows a rear-side view of the light and privacy shade 10 attached using the screen clips 18a, 18b, 18c and 18d to a laptop 8 and 9, with the laptop screen angled backwards at a range of 100° to 125° angle for optimum viewing when the laptop is placed on a standard table which is typically 25" to 33" high and the user is sitting on a standard height chair which is typically 18" to 22" high. The panels 11, 12 and 13 are visible on the left side, right side and top side. Each of the panels may be made of a rigid material, a semi-rigid material or a flexible material within a frame. The panels could be constructed from a variety of materials, including but not limited to polypropylene, polyethylene, plastic, resin board, foam board, fabric, rubber, silicon rubber or a multi-ply cardboard such as chipboard. The three panels of the light and privacy shade 10 may be made of the same material or of different materials. The outer surfaces 16, and the hinge portions 14 and 15 are the only structures on the innovative light and privacy shade that are visible to a passer-by, and serve for blocking light and heat, as well as for providing privacy of the contents displayed on screen from unwanted viewing.

Figure 4:
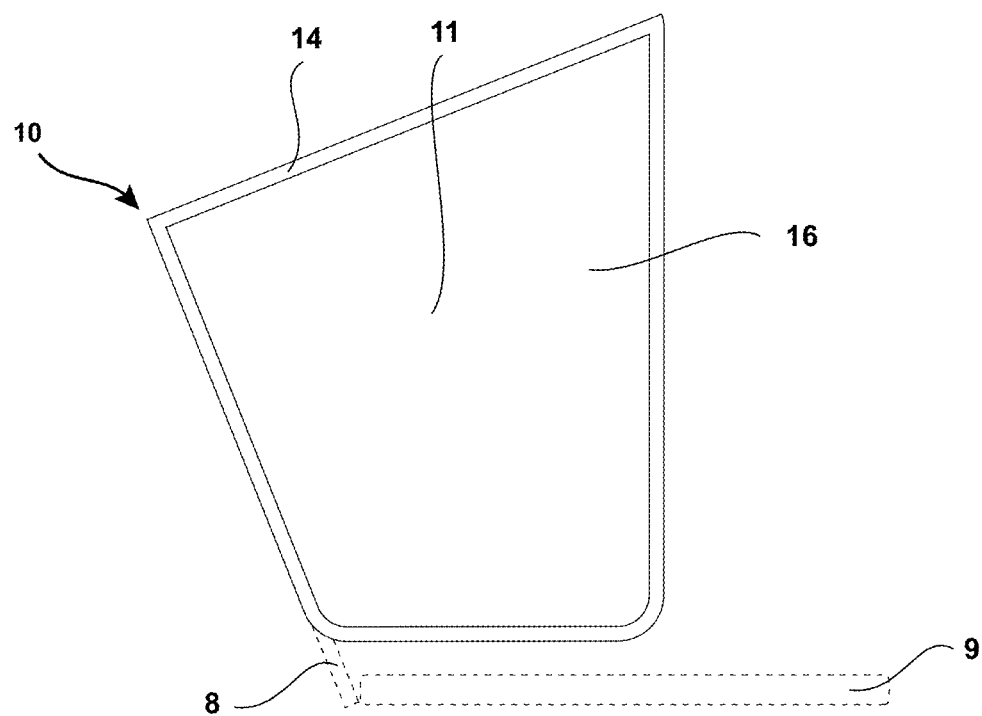
FIG. 4 is a left-side facing view of the light and privacy shade attached to a laptop computer screen, with the screen tilted back at an angle.

FIG. 4 shows a left-side view of the light and privacy shade 10 attached to a laptop 8 and 9, with the laptop screen 8 angled backwards at a range of 100° to 125° angle for optimum viewing when the laptop is placed on a standard height table which is typically 25 to 33 inches high and the user is sitting on a standard height chair which is typically 18 to 22 inches high. The left panel 11, left hinge portion 14 and the outer surface 16 are visible. The upper edge of panel 11 extends at right angles from the screen 8.

Figure 5:
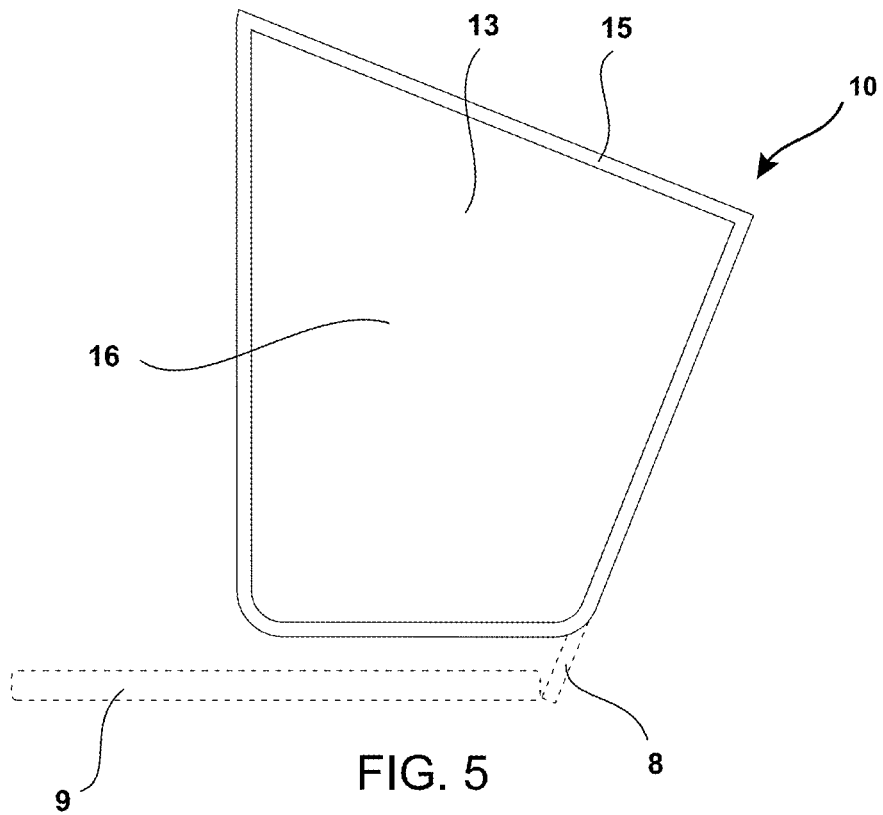
FIG. 5 is a right-side facing view of the light and privacy shade attached to a laptop computer screen, with the screen tilted back at an angle.

FIG. 5 shows a right-side view of the light and privacy shade 10 attached to a screen 8 of laptop 9, with the laptop screen 8 angled backwards at a range of 100° to 125° angle for optimum viewing when the laptop 9 is placed on a standard height table which is typically 25 to 33 inches high and the user is sitting on a standard height chair which is typically 18 to 22 inches high. The right panel 13, right hinge portion 15 and the outer surface 16 are visible. The upper edge of panel 13 extends at right angles from the screen 8.

Figure 6:
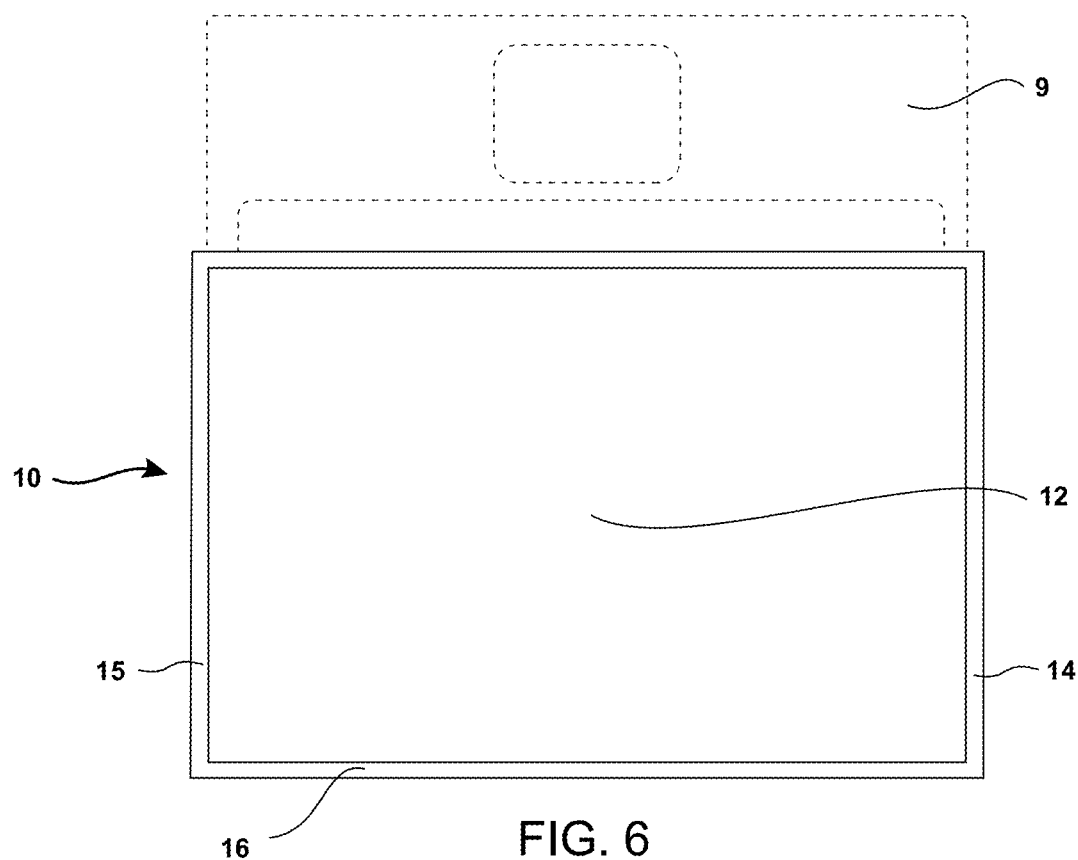
FIG. 6 is a top view of the light and privacy shade attached to a laptop computer screen, with the screen tilted back at an angle.

FIG. 6 shows a two-dimensional top view of the light and privacy shade 10 attached to the screen of a laptop 9, identifying the middle panel 12, outer surface 16 and the hinges 14 and 15.

Figure 7:
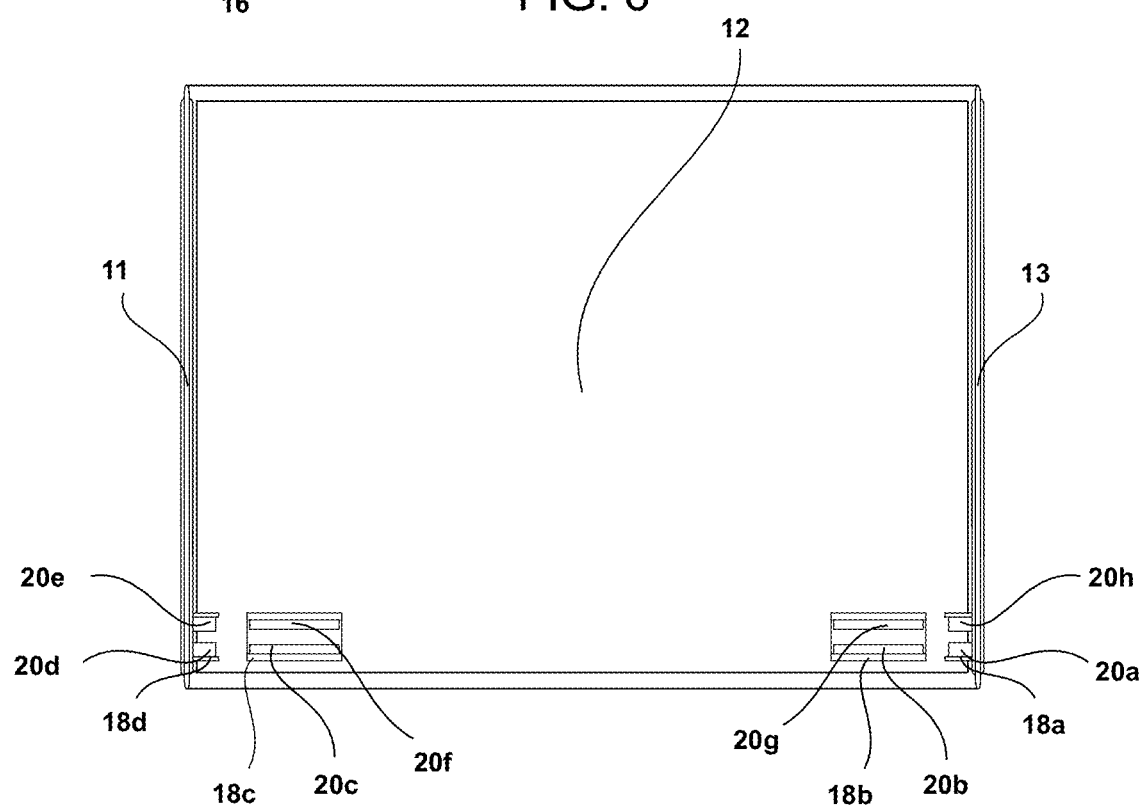
FIG. 7 is a bottom view of the light and privacy shade with the left side and right side panels folded inwards at 90 degrees to the horizontal middle panel.

FIG. 7 shows a 2-dimensional bottom view of the light and privacy shade 10 with left panel 11 and right panel 13 angled at 90 degrees to the horizontal middle panel 12. The rubber pads 20a, 20b, 20c, 20d, 20e, 20f, 20g and 20h of each screen clip 18a, 18b, 18c and 18d both protect the screen and provide a non-slip rubberized interface to attach the light and privacy shade 10 to laptop screens and electronic device screens.

Figure 8:
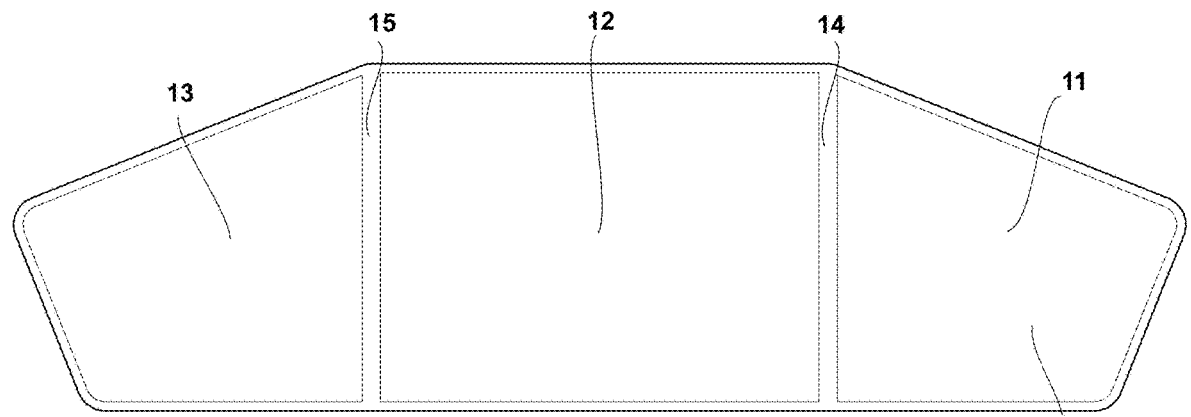
FIG. 8 is a top view of the outer side of the light and privacy shade when unfolded flat.

FIG. 8 shows a 2-dimensional top-down view of the outer surface 16 of the light and privacy shade 10 unfolded flat on a table. The left panel 11, middle panel 12 and right panel 13 are identified and outlined, with the two flexible hinge portions 14 and 15 placed in between the sides of adjacent panels. The upper edge of the left panel 11 and right panel 13 slope away from the upper edge of the middle panel 12 at a 20° angle.

Figure 9:
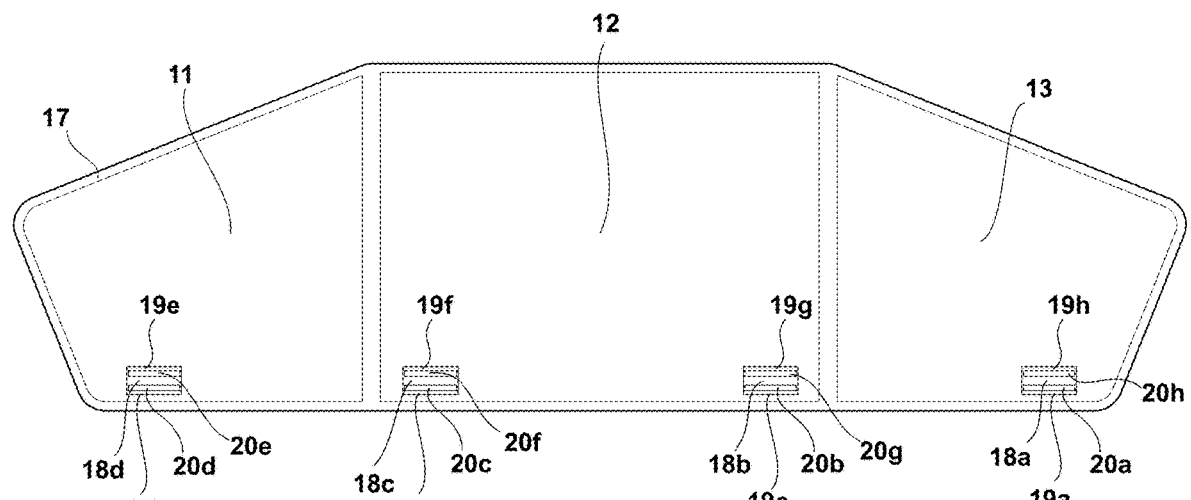
FIG. 9 is a bottom view of the inner side of the light and privacy shade when unfolded flat.

FIG. 9 shows a 2-dimensional bottom view of the inner surface 17 of the light and privacy shade 10 unfolded flat. The left panel 11, middle panel 12 and right panel 13 are identified and outlined, with the two flexible hinge portions 14 and 15 in between the sides of each panel. The light and privacy shade 10 utilizes four screen clips 18a, 18b, 18c and 18d which each have two opposing vertical walls 19a, 19b, 19c, 19d, 19e, 19f, 19g and 19h which themselves may contain integrated rubber pads 20a, 20b, 20c, 20d, 20e, 20f, 20g and 20h. The light and privacy shade is positioned so that the electronic device screen slides inside the channels which lie between the plastic walls and optional rubber pads. A range of flexibility is built into one of each opposing walls 19e, 19f, 19g and 19h and their optional rubber pads 20e, 20f, 20g and 20h providing a spring-like pincer movement which allows the clips to clamp onto screens of varying thicknesses, from 0.02 to 0.75 inches or greater. With gentle pressure, a secure bond is formed between the device screen 8 and the screen clip 18a, 18b, 18c and 18d, and thus attaches the light and privacy shade 10 securely to the laptop or electronic device screen 8. To release the light and privacy shade 10, a gentle pull in the reverse direction against each clip removes the light and privacy shade 10 from the device screen 8.

Figure 10:
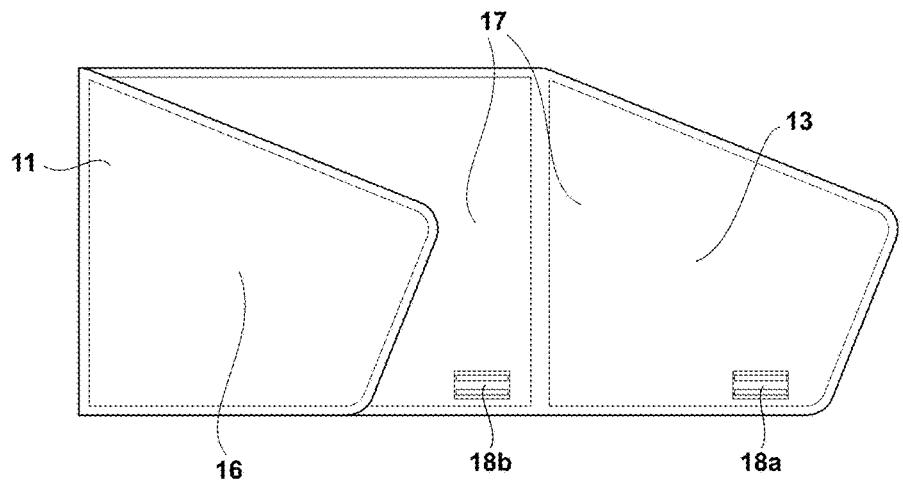
FIG. 10 is a bottom view of the light and privacy shade when one panel is folded inward.

FIG. 10 shows a two-dimensional top-down view of the inner surface 17 of the light and privacy shade 10 with the left panel 11 folded inwards, exposing only two clips 18a and 18b, as well as the outer surface 16 of panel 11.

Figure 11:
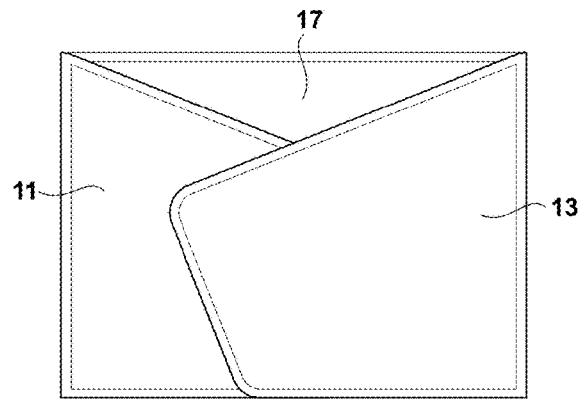
FIG. 11 is a bottom view of the light and privacy shade when both panels are folded inward, ready for carrying or placing within a bag or laptop sleeve.

FIG. 11 shows a two-dimensional top-down view of the inner side 17 of the light and privacy shade with both left panel 11 and right panel 13 folded inwards for optimum space-saving ideal for transporting in a bag or device case.

Figure 12:
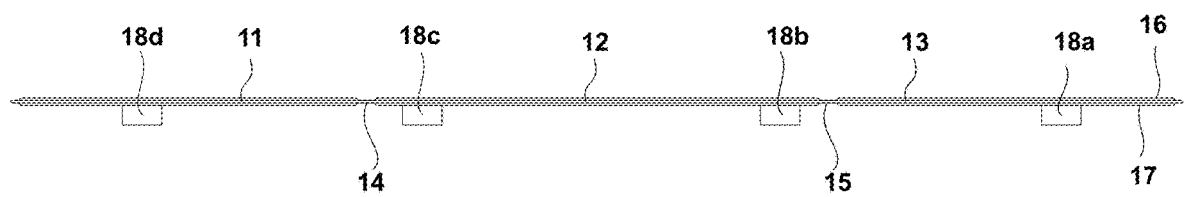
FIG. 12 is cross-section frontward-view of the light and privacy shade when unfolded flat.

FIG. 12 shows a two-dimensional frontward profile-view of the light and privacy shade 10 unfolded flat and its integrated screen clips 18a, 18b, 18c and 18d. The three thicker sections are formed by the three rigid panels 11, 12 and 13 which contain the screen clips fitted within their surface. The thinner sections illustrate the areas whereby the outer surface 16 and inner surface 17 are fused together using an adhesive or sealing method such as radio-frequency welding, heat sealing or stitching, thus forming the flexible hinge portions 14 and 15. The outer surface 16 and inner surface 17 could be constructed from a variety of materials, including but not limited to vinyl, leather, synthetic leather, cotton, linen, cork, cardboard, paper, rubber, silicon rubber, polyethylene, plastic and polyurethane coated fabric.

Figure 13:
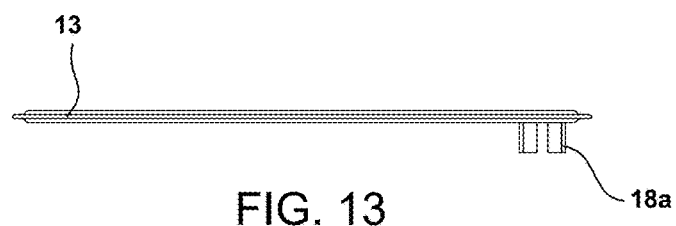
FIG. 13 is a cross-section right-side view of the light and privacy shade when unfolded flat.

FIG. 13 shows a two-dimensional right-side view of the light and privacy shade 10 unfolded flat and screen clip 18a.

Figure 14:
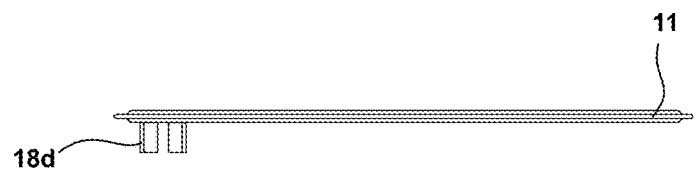
FIG. 14 is a cross-section left-side view of the light and privacy shade when unfolded flat.

FIG. 14 shows a two-dimensional left-side view of the light and privacy shade 10 unfolded flat and the screen clip 18d.

Figure 15:
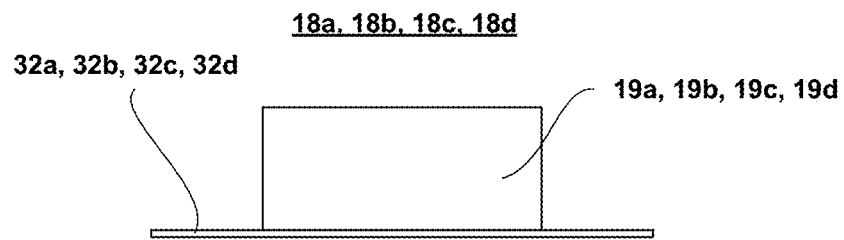
FIG. 15 is a front-facing view of the screen clip which is used to attach the light shade and privacy shade to the electronic device screen."

FIG. 15 shows a two-dimensional front-view of the screen clip 18a, 18b, 18c and 18d. In the preferred embodiment shown, there are four screen clips used in the innovative light and privacy shade 10 for attaching the three panels 11, 12 and 13 to a screen for blocking light and heat, and for providing privacy. A minimum of one screen clip 18a for the right side of the screen 8, one screen clip 18d for the left side of the screen 8, and two screen clips 18b and 18c for the top of the device screen 8 are shown. If desired, however, only one clip, or more than two clips can be used for the top of the device screen 8, and two clips or more for the sides of the screen may also be used.

Each clip 18a, 18b, 18c and 18d is made from molded plastic or metal, preferably with a flat base 32a, 32b, 32c and 32d which is embedded and adhered within holes 30a, 30b, 30c and 30d cut into each of the panels so that the clips sit flush to the surface of the panel, allowing the light and privacy shade therefore to sit flush to the edges of the electronic device screen, thus blocking out the maximum amount of light. Two pairs of opposing vertical sides 19a, 19b, 19c, 19d, 19e, 19f, 19g and 19h rise from the base at 90° angles and within those vertical sides of each clip may be contained two rubber pads 20a, 20b, 20c, 20d, 20e, 20, 20g and 20h, which create a cushioned channel for which the electronic device screen can sit, thus securing the light and privacy shade 10 to the electronic device screen 8. The cross sectional shape of the opening between the foam rubber pads may be rectangular, as shown, or may be angled or contoured with a curve or the like to permit easy insertion and withdrawal of the edges of the screen 8.

Figure 16:
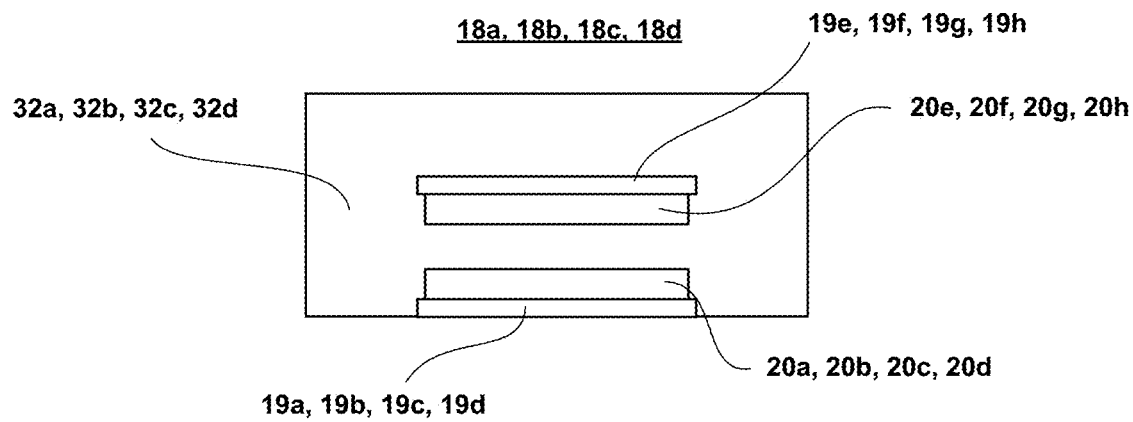
FIG. 16 a top-down view of the screen clip which is used to attach the light shade and privacy shade to the electronic device screen.

FIG. 16 shows a two-dimensional top-down view of the screen clips 18a, 18b, 18c and 18d, and the two rubber pads 20a, 20b, 20c, 20d, 20e, 20f, 20g and 20h, which allow the light and privacy shade 10 to be attached to the device screen easily, and detached easily and quickly by forming a tight seal between the surface of the screen and the walls of the molded plastic clip, without requiring the use of any other materials such as elastic or Velcro® hook and loop. Each screen clip 18a, 18b, 18c and 18d is W 2× D 1 inch for the base 32a, 32b, 32c and 32d, and W 1.25× D 0.5× H 0.4 inches for the opposing vertical walls 19a, 19b, 19c, 19d, 19e, 19f, 19g and 19h. The width of the channel in between the opposing walls flexes according to the thickness of the device screen, using an element of spring-like, elastic movement which is inherent in one of each pair of opposing vertical walls 19*e*, 19*f*, 19*g* and 19*h*, and in the rubber pads 20*a*, 20*b*, 20*c*, 20*d*, 20*e*, 20*f*, 20*g* and 20*h* allowing the screen clips to flex in size to fit a range of device screen thicknesses.

Figure 17:
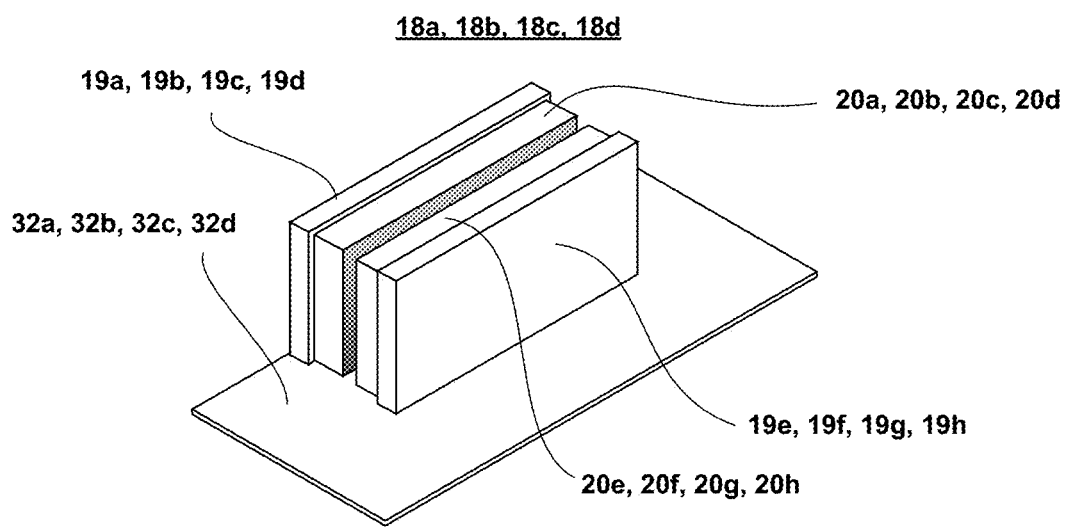
FIG. 17 is an isometric view of the screen clip which is used to attach the light shade and privacy shade to the electronic device screen.

FIG. 17 shows a three-dimensional isometric view of the screen clip 18*a*, 18*b*, 18*c* and 18*d*, illustrating the base 32*a*, 32*b*, 32*c* and 32*d*, the sides 19*a*, 19*b*, 19*c*, 19*d*, 19*e*, 19*f*, 19*g* and 19*h* and the rubber pads 20*a*, 20*b*, 20*c*, 20*d*, 20*e*, 20*f*, 20*g* and 20*h* which are adhered using a heat-proof adhesive, capable of withstanding temperatures of over 150° Fahrenheit, within the walls of the screen clip.

Figure 18:
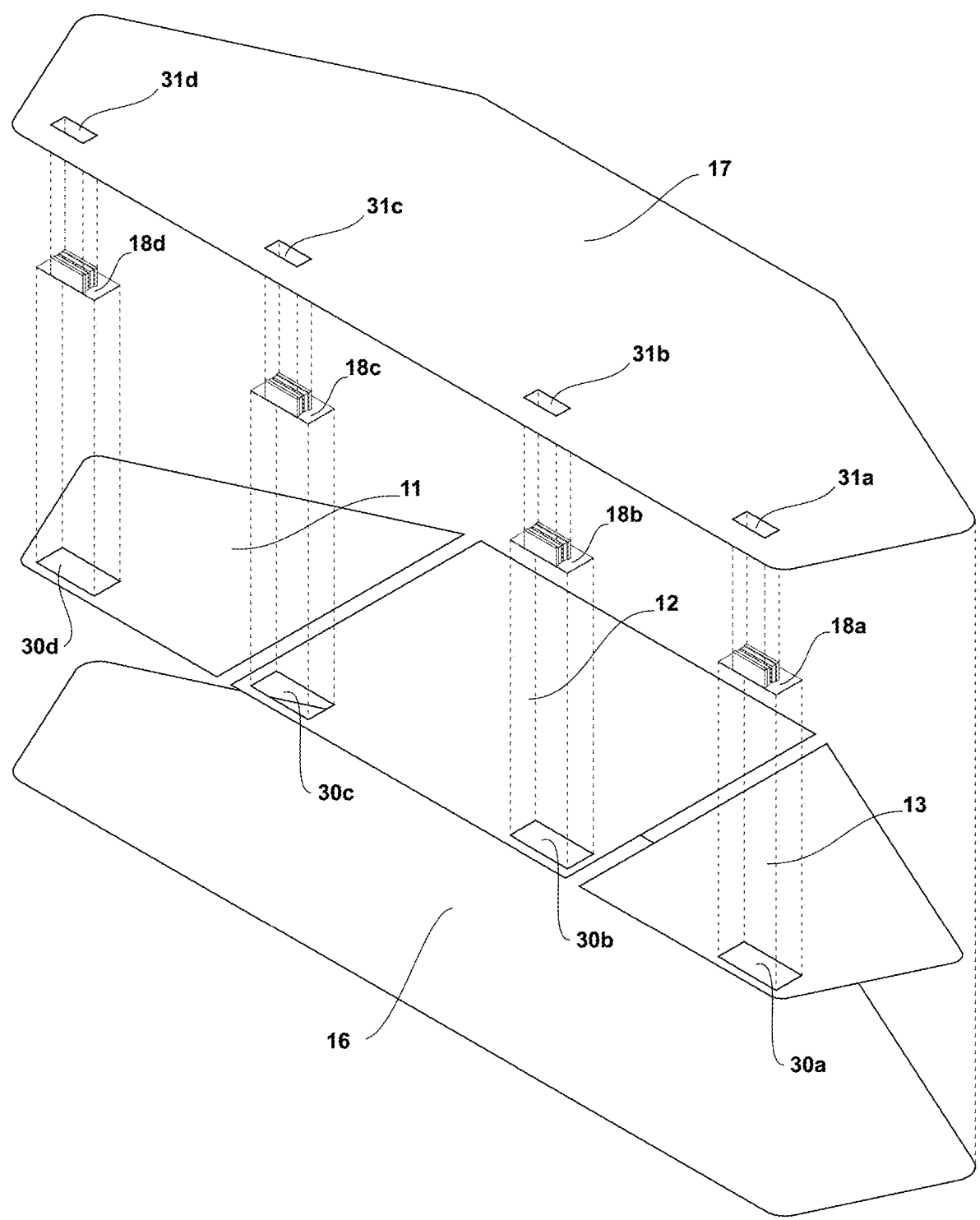
FIG. 18 shows an exploded isometric view of each section of the light shade and privacy shade showing each of the parts of the construction before they are sealed together.

FIG. 18 shows an exploded isometric view of each segment of the preferred embodiment design. The outer surface layer of polyurethane coated fabric 16, next are the three sections of semi-rigid polypropylene board 11, 12 and 13, which lay flat onto the outer layer 16, the screen clips 18*a*, 18*b*, 18*c* and 18*d* which are adhered snugly into the holes 30*a*, 30*b*, 30*c* and 30*d* in 11, 12 and 13, followed by the inner layer of fabric 17 which contains smaller holes 31*a*, 31*b*, 31*c* and 31*d* for which the top of the clips penetrate through. The outer layer 16 and inner layer 17, and panels 11, 12 and 13 of the unit are sealed together using heat-proof adhesive, heat sealing, stitching or radio frequency sealing technology, also commonly referred to as radio frequency welding, or a combination of methods. The hinge portions 14 and 15 are formed in the preferred embodiment by having opposed portions of the outer layer 16 and inner layer 17 joined by radio frequency welding or an adhesive or other sealing method, without panels in-between.

As would be understood by those skilled in the art, each panel 11, 12, 13 may be covered separately by outer layers 16 and inner layers 17, and the edges of adjacent panels joined by separate hinge structures made of fabric, plastic, cardboard, metal or the like, that can be affixed to each panel with adhesives, staples, stitches, screws, radio-frequency welding or the like.

Detailed Description of the Second Embodiment

The second embodiment of the light and privacy shade for electronic devices includes the addition of a back panel for shielding the back of these devices from the heat generated by intense light such as sunlight to prevent the electronic device from overheating.

Figure 19:
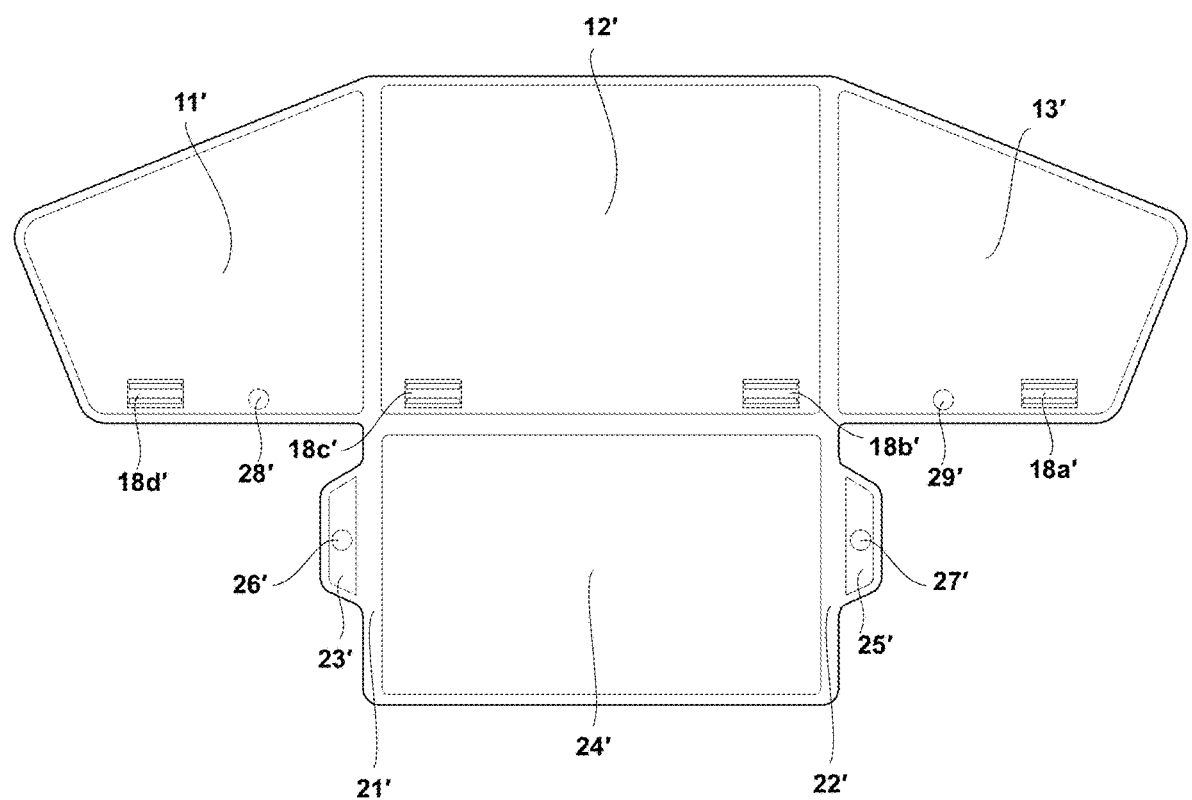
FIG. 19 is a bottom view of the inner side of the second embodiment of the light shade and privacy shade unfolded flat which has the addition of a back panel to further shade the rear of the screen from light and heat generated by intense light.

FIG. 19 is a bottom view of the second embodiment of the light and privacy shade unfolded flat which has the addition of a rear panel 24' to shade the electronic device further from overheating in intense light such as sunlight. The rear panel 24' may be formed along with the panels 11', 12' and 13' from the same pair of outer layer 16' and inner layer 17' as illustrated in FIG. 18', by simply extending the material to the necessary shape. A hinge portion 21' and 22' may be formed in the same manner as described for hinge portions 14' and 15'. The rear panel 24' may be attached to the left panel 11' and right panel 13' using the left flap 23' and right flap 25', which connects to the side panels 11' and 13' via integrated magnets 26', 27', 28' and 29' which sit embedded into holes cut into the side panels 11' and 13' and left flap 23' and right flap 25'. Other structures for securing the flaps 23' and 25' to the side panels, such as hook and loop, button and loop, or the like, also can be used.

Figure 20:
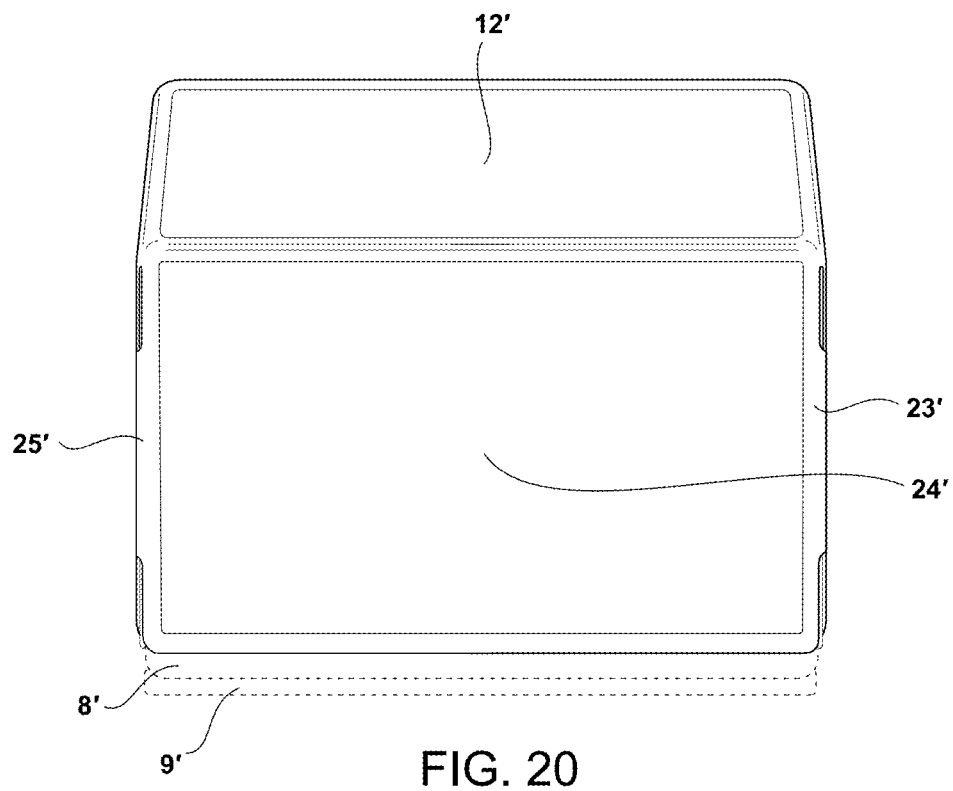
FIG. 20 is a rear-facing view of the light and privacy shade illustrating the addition of the rear panel to further shade the electronic device from light and heat.

FIG. 20 is a rear-facing view of the light and privacy shade illustrating the addition of the rear panel 24', shielding the back of the device screen, secured to the left panel using the left flap 23' and the right panel using the right flap 25'.

Figure 21:
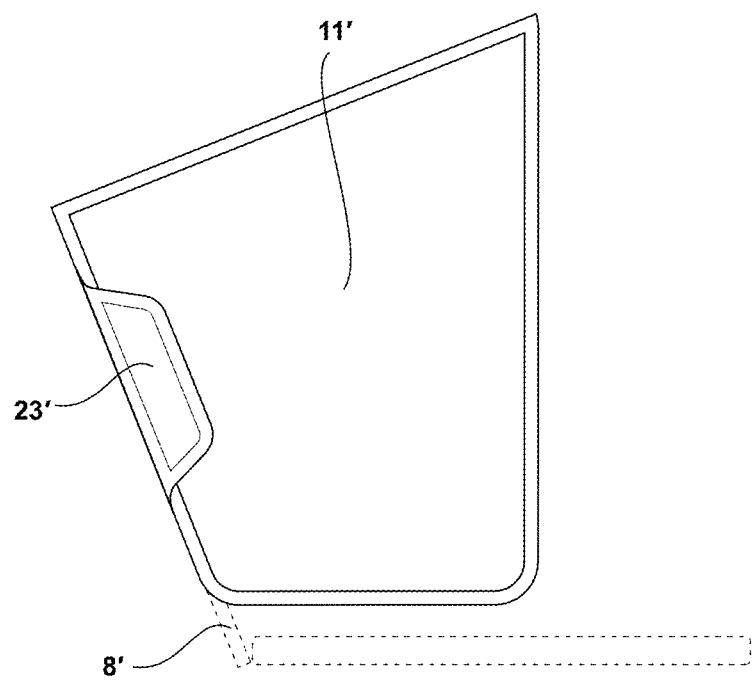
FIG. 21 is a left side view of the light and privacy shade illustrating the side flap which secures the rear panel to the left panel.

FIG. 21 is a left side view of the light and privacy shade attached to an electronic device screen 8', illustrating the left side flap 23' which secures the rear panel to the left panel 11'. The right side is identical but a mirror image.

Detailed Description of the Third Embodiment

The third embodiment of the light and privacy shade for electronic devices is for use particularly with electronic tablets and smart phones that have the computer processing unit integrated behind the screen area, including, but not limited to, Apple® iPads, Amazon Fire® Tablets, Microsoft® Surface® tablets, Apple® iPhones®, Android® smart phones, display screens and gaming devices. Using the same screen clips and construction method, but a variation on the shape of the side-panels, and the inclusion of a back panel, this version can stand upright while supporting the electronic tablet in an angled position, perfect for devices such as electronic tablets or gaming devices which do not have a self-standing base. Since such devices have the computer processing chips and electronics integrated directly within the screen area, it is important to shield the back of these devices from the heat generated by intense light such as sunlight to prevent the electronic device from overheating.

Figure 22:
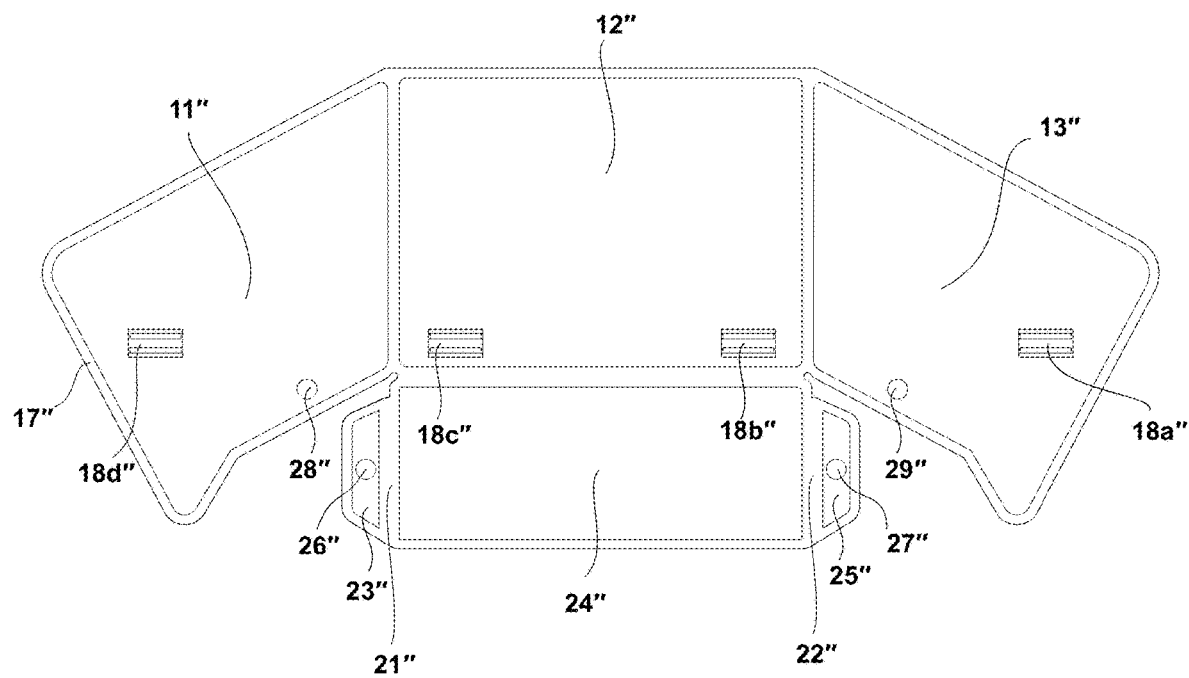
FIG. 22 is a bottom view of the third embodiment of the light and privacy shade, unfolded flat illustrating the screen clips, angled sides and rear panel.

FIG. 22 is a bottom view of the third embodiment of the light and privacy shade, unfolded flat illustrating the screen clips 18*a*", 18*b*", 18*c*" and 18*d*", the side panels 11" and 13", the top panel 12" and the rear panel 24" plus the left flap 23" and right flap 25" which when folded ready for attaching to an electronic device connect to the side panels 11" and 13" using integrated hidden magnets 26", 27", 28" and 29". The upper edge of the left panel 11" and right panel 13" slope away from the upper edge of the middle panel 12" at a 28-30° angle, compared to the preferred embodiment which slopes away from the middle panel 12" at an angle of 20°. This slight adjustment in the angle of the side panels 11" and 13" allows the light and privacy shade 10" to support electronic tablet devices at approximately 118° angle from the surface, optimum for viewing.

Figure 23:
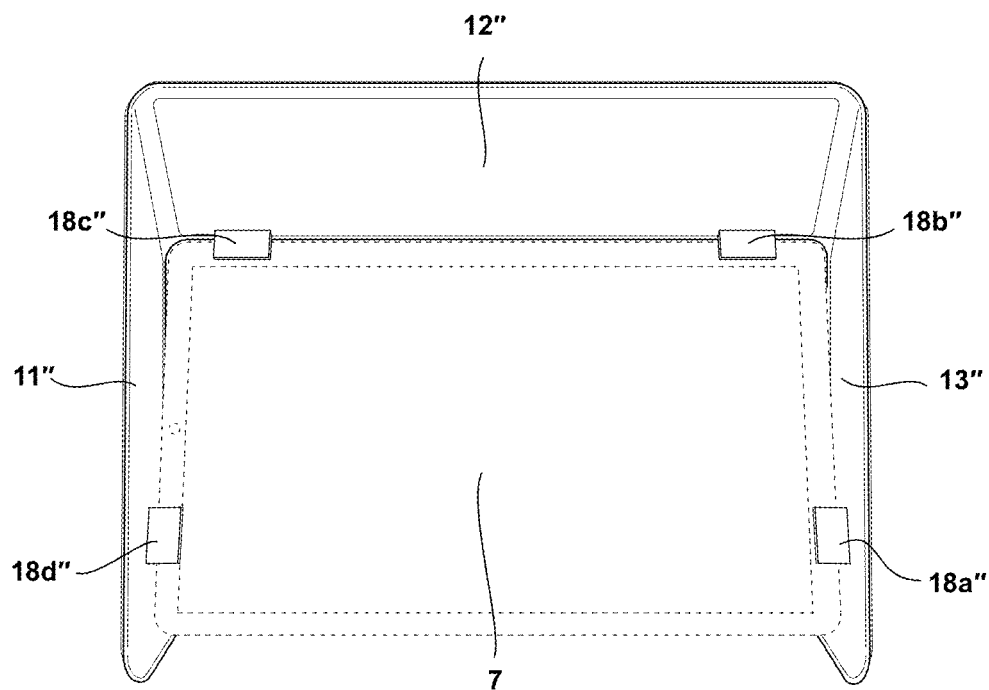
FIG. 23 is a frontward-facing view of the third embodiment of the light and privacy shade, illustrating it standing up while supporting the electronic tablet in an upright, angled-back position.

FIG. 23 is a frontward-facing view of the third embodiment of the light and privacy shade, illustrating it standing up while supporting the electronic device 7" in an upright, angled-back position. Illustrated are the four screen clips 18*a*", 18*b*", 18*c*" and 18*d*" which grasp the electronic device securely to the shade, with the option to raise the device from the hot table surface thus protecting it further from heat generated by intense light such as sunlight.

Figure 24:
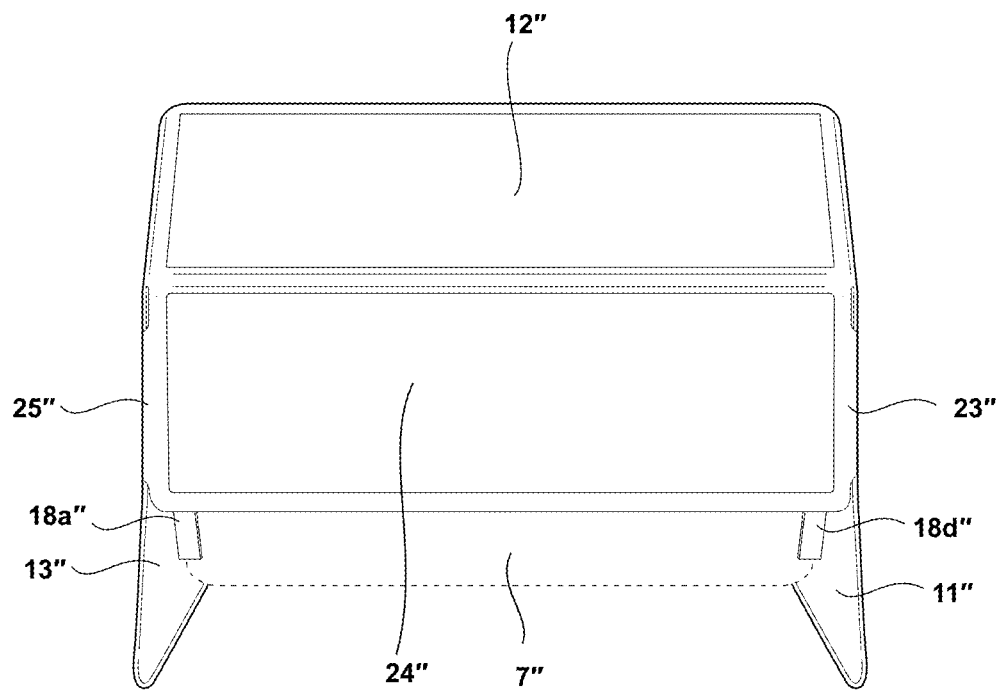
FIG. 24 is a rear-facing view of the third embodiment of the light and privacy shade, illustrating the rear panel which further shields the electronic device from overheating in intense light such as sunlight.

FIG. 24 is a rear-facing view of the third embodiment of the light and privacy shade, illustrating top panel 12" and the rear panel 24" which shields the electronic tablet from direct light, and protecting the device from overheating in intense light such as sunlight. Visible are the two lower clips 18*a*" and 18*d*" which connect to the lower region of the electronic device. The left panel 11" and right panel 13" are shaped in such a way to allow the light and privacy shade to stand upright, supporting the device in an upright, angled-back position optimum for viewing. The left flap 23" and right flat 25" attach the rear panel to the two side panels 11" and 13".

As would be understood by those skilled in the art, the flaps 23" and/or 25" may be attached to either of the rear panel or side panels.

Figure 25:
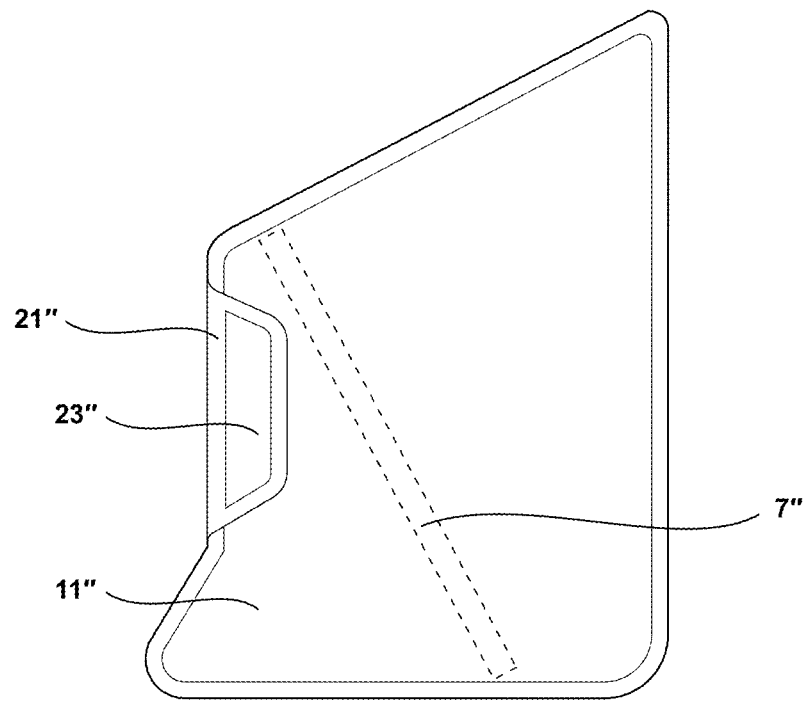
FIG. 25 is a left-side facing view of the third embodiment of the light and privacy shade, illustrating the magnetic flap which secures the rear panel to the left side panel.

FIG. 25 is a left-side facing view of the third embodiment of the light and privacy shade, illustrating the left flap 25" which secures the rear panel to the left side panel 11", using integrated hidden magnets. The broken lines illustrate the electronic device supported from inside the light and privacy shade at an angle from the horizontal within a range of 90° and 130°, preferably 118° for optimal viewing.

Figure 26:
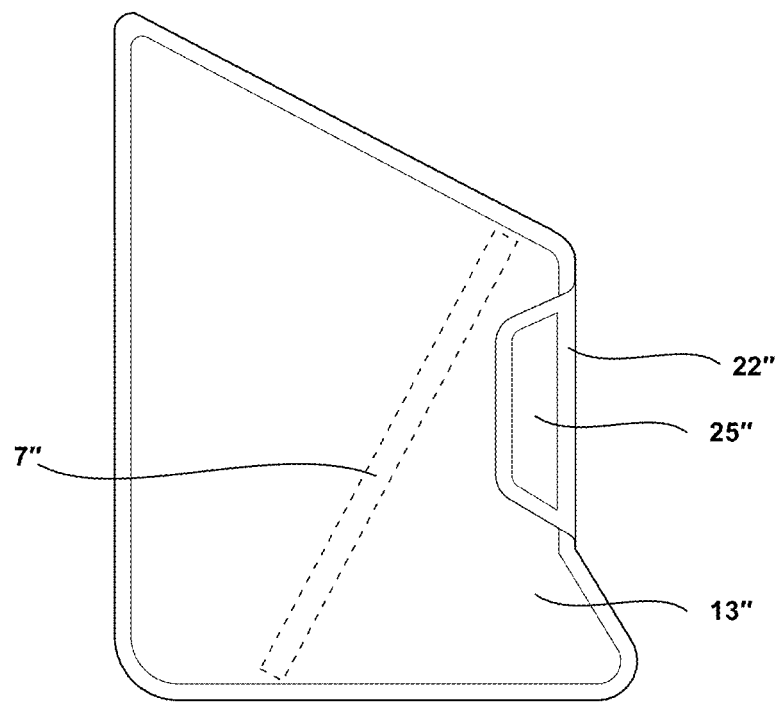
FIG. 26 is a right-side facing view of the third embodiment of the light and privacy shade, illustrating the magnetic flap which secures the rear panel to the right side panel.

FIG. 26 is a right-side facing view of the third embodiment of the light and privacy shade, illustrating the right flap which secures the rear panel to the right side panel 13". The broken lines illustrate the electronic device supported from inside the light and privacy shade at a 118° angle, optimum for viewing.

Figure 27:
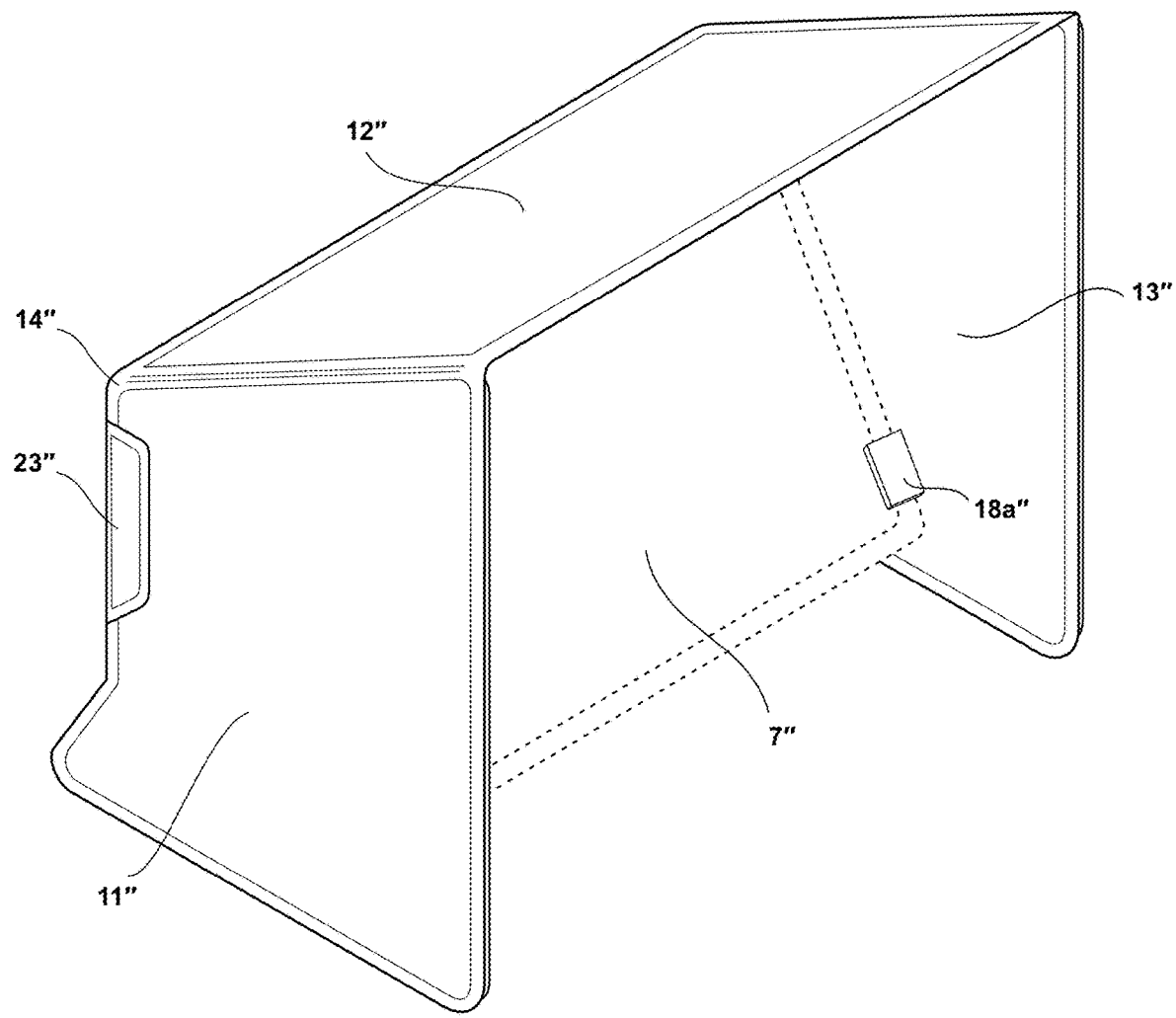
FIG. 27 is an isometric view of the third embodiment, which has angular sides particularly for use with electronic tablets such as Apple® iPads®, allowing the light and privacy shade to stand-up of its own accord while supporting the tablet in an upright, angled-back position optimum for viewing.

FIG. 27 is an isometric three-dimensional view of the third embodiment, which has an alteration on the angles of the side panels 11" and 13", allowing the light and privacy shade to stand-up of its own accord while supporting the electronic device in an upright, angled-back position optimum for viewing. Visible is the screen clip 18a" which supports the electronic tablet, and the left flap 23" which attaches to the left panel 11" via integrated hidden magnets or similar affixing structures to secure the rear panel to the side panels.

Figure 28:
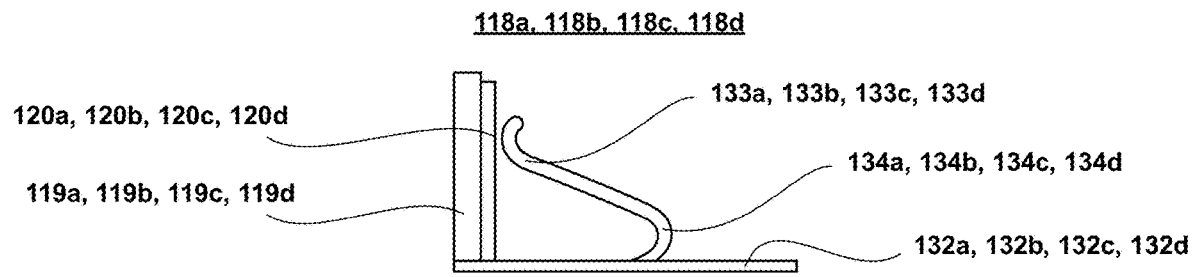
FIG. 28 is left-side cross-sectional view of a second version of screen clip design.

FIG. 28 is a left-side cross-sectional view of a second version of screen clip 118a, 118b, 118c and 118d design which replaces one of the walls with a flexible 'S' shape wall 133a, 133b, 133c and 133d. The curvature of the wall, paired with the elastic nature of the material is made with, allows it to flex inwards and outwards to accommodate different thicknesses of screen 8, while still applying sufficient pressure using a pincer movement to the surface of the screen 8 as to form a secure attachment between the wall 119a, 119b, 119c, 119d, the optional rubber pads 120a, 120b, 120c and 120d, and the flexible wall 133a, 133b, 133c and 133d, with the screen 8 secured in between.

Figure 29:
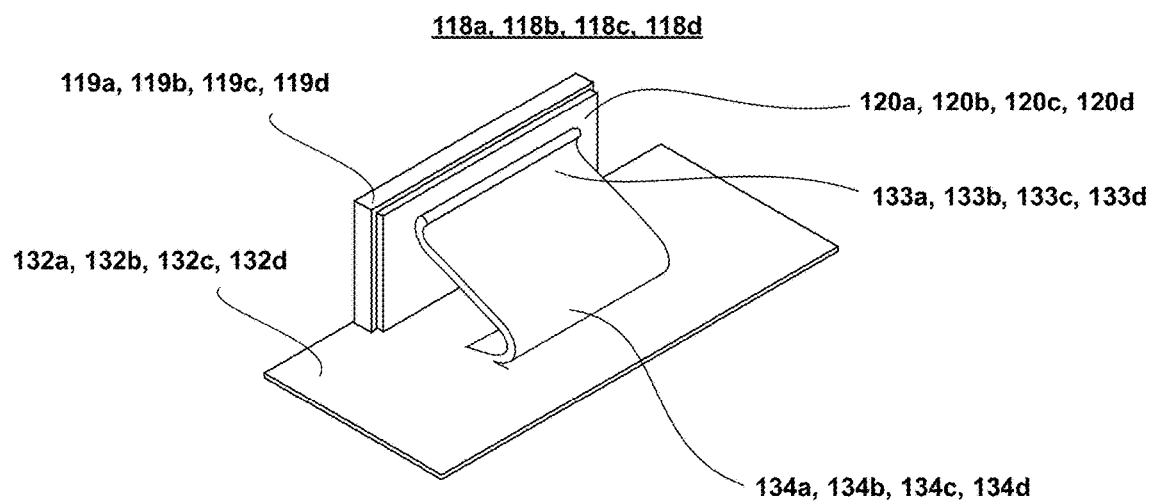
FIG. 29 is an isometric, three-dimensional view of the second version of screen clip design.

FIG. 29 is an isometric, three-dimensional view of the second version of screen clip 118a, 118b, 118c and 118d. The curvature and flexible wall has an 's' shape characterized by a curved base 134a, 134b, 134c and 134d which acts like a spring, allowing the wall 133a, 133b, 133c and 133d to raise upwards, downwards, backwards and forwards to open and close the clip 118a, 118b, 118c and 118d to different thicknesses of screen 8, while the curve at the top allows the screen to be pushed into place without catching onto the edge of the screen, and allowing it to be removed from the screen clip without requiring the user to manipulate the clip with their hands. It snaps into place when pushed onto screens of different thicknesses and may be quickly released when pressure is applied in the reverse direction to remove the clip 118a, 118b, 118c and 118d from the screen 8. The flexible wall 133a, 133b, 133c and 133d and its spring-like base 134a, 134b, 134c and 134d can be made from ABS plastic, polyethylene, metal or other plastics, and may be attached to the base 132a, 132b, 132c and 133d, but more typically is molded together from one material as just one piece, along with the back wall 119a, 119b, 119c and 119d. Manufacturing a clip with such an effective spring-like quality from just one-piece is called a "compliant clip". Such clips can be 3D printed, and injection molded using a variety of plastics, metals and other materials.

Figure 30:
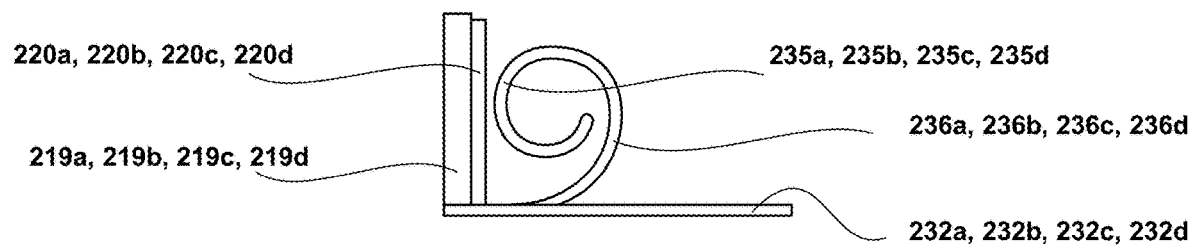
FIG. 30 is a left-side cross-sectional view of the third version of screen clip design.

FIG. 30 is a left-side cross-sectional view of the third version of screen clip 218a, 218b, 218c and 218d. Instead of an "S" shaped wall, this version utilizes a spiral-shaped flexible wall 235a, 235b, 235c and 235d, with a spring-like base 236a, 236b, 236c and 236d, which may resemble the number nine when viewed from the left side as shown.

Figure 31:
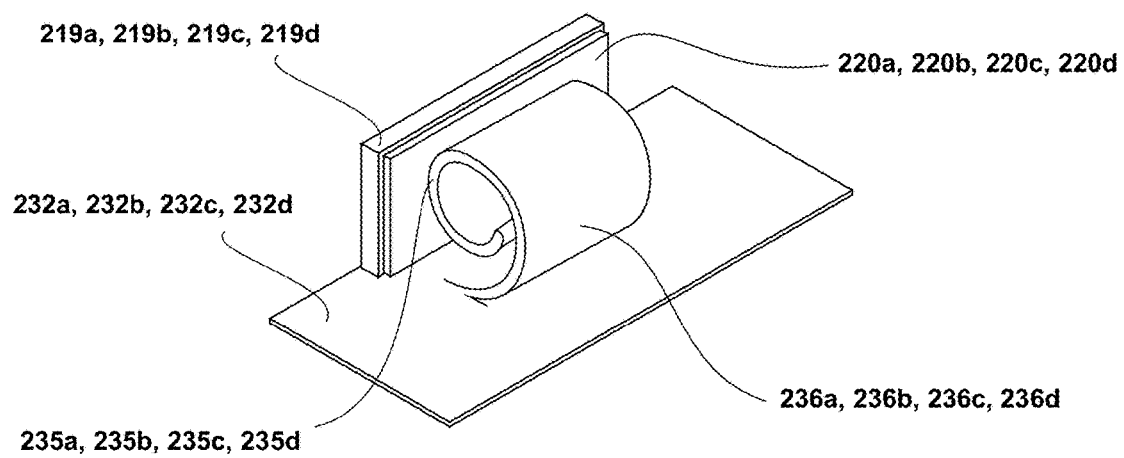
FIG. 31 is an isometric, three-dimensional view of the third version of screen clip design.

FIG. 31 is an isometric, three-dimensional view of the third version of screen clip 218a, 218b, 218c and 218d. The lower tail-end of the nine shape 236a, 236b, 236c and 236d provides the spring flexibility required to allow the wall to flex forward and backwards to accommodate different thicknesses of screen 8. With gentle pressure the screen clip will snap onto screens ranging from 0.025 inches to 1.0 inches thick, because of the elastic, flexible nature of the wall 235a, 235b, 235c and 235d and its coiled base 236a, 236b, 236c and 236d.

Figure 32:
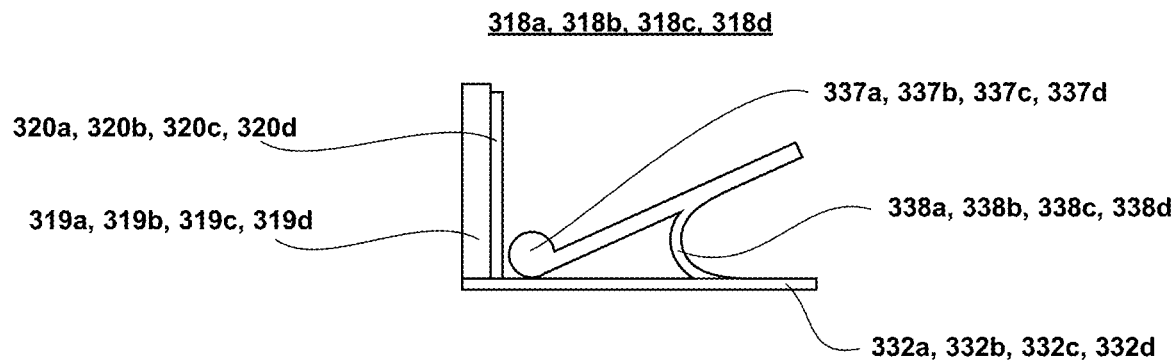
FIG. 32 is a left-side cross-sectional view of the fourth version of screen clip design.

FIG. 32 is a left-side cross-sectional view of the fourth version of screen clip 318a, 318b, 318c and 318d. This version utilizes a mechanism similar to a bull-dog clip. The flexible wall 337a, 337b, 337c and 337d are adjoined to the base 332a, 332b, 332c and 332d with a curved hinge-like structure 338a, 338b, 338c and 338d. By pressing down on the top rear of the wall 337a, 337b, 337c and 337d, much like a bull-dog clip, the clip will open upwards to provide a wider channel, allowing a screen 8 to fit into the channel between walls 319a, 319b, 319c and 319d and wall 337a, 337b, 337c and 337d. By releasing the clip, it clamps-down closed securing a bond with the screen 8. While this may be manufactured with a typical metal-sprung hinge structure, it is preferably made with modern injection-molding techniques and plastics as one single piece, requiring no additional parts, as illustrated.

Figure 33:
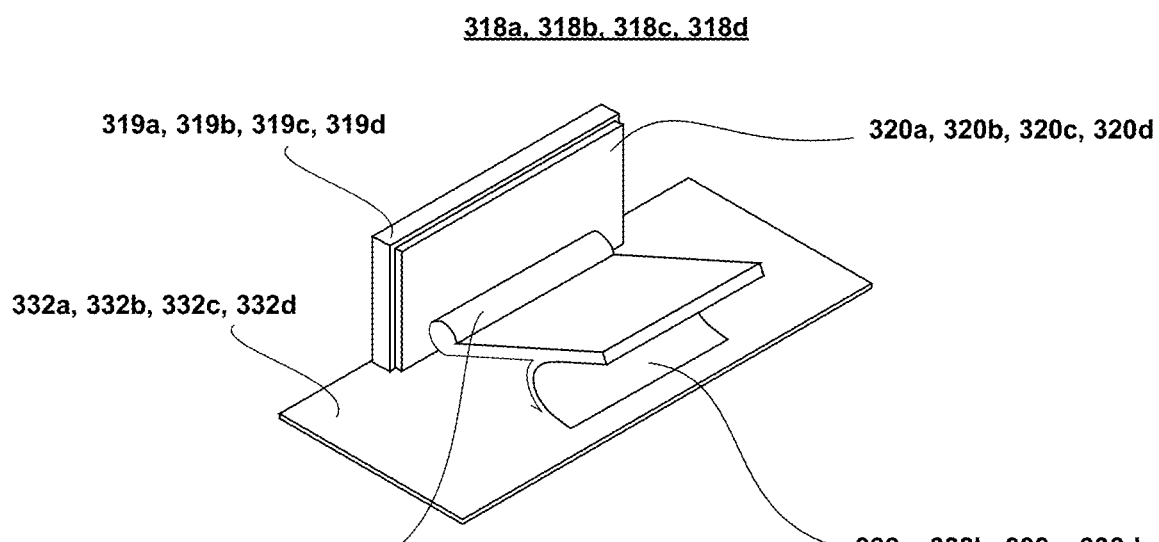
FIG. 33 is an isometric, three-dimensional view of the fourth version of screen clip design.

FIG. 33 is an isometric, three-dimensional view of the fourth version of screen clip 318a, 318b, 318c and 318d. Unlike a typical hinge, this 'compliant clip' hinge is made from the same piece of material as the wall 337a, 337b, 337c and 337d, and can be flexed easily due to the curvature of the structure and the elasticity of the material it is made from.

Figure 34:
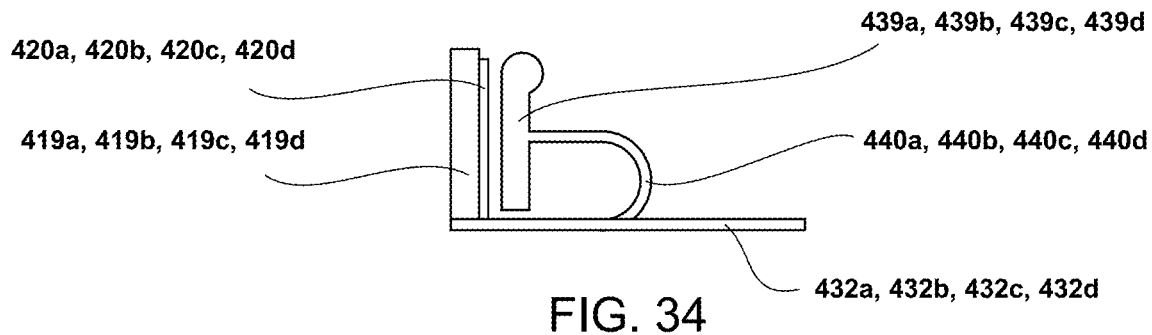
FIG. 34 is a left side cross-sectional view of the fifth version of screen clip design.

FIG. 34 is a left side cross-sectional view of the fifth version of screen clip 418a, 418b, 418c and 418d. This version has a vertical wall 439a, 439b, 439c and 439d which floats above the base 432a, 432b, 432c and 432d, attached to the base with a curved structure 440a, 440b, 440c and 440d of the same material which provides ample forward force toward the opposing wall 419a, 419b, 419c and 419d, while also providing sufficient backwards and forwards movement so that the wall 439a, 439b, 439c and 439d can flex to attach to screen 8 which may range from 0.02 inches to 1 inch thick. Wall 439a, 439b, 439c and 439d has a rounded top, which makes inserting and removing the screen 8 into and from the clip easier, by removing right-angled edges that may otherwise catch on the edge of the screen 8.

Figure 35:
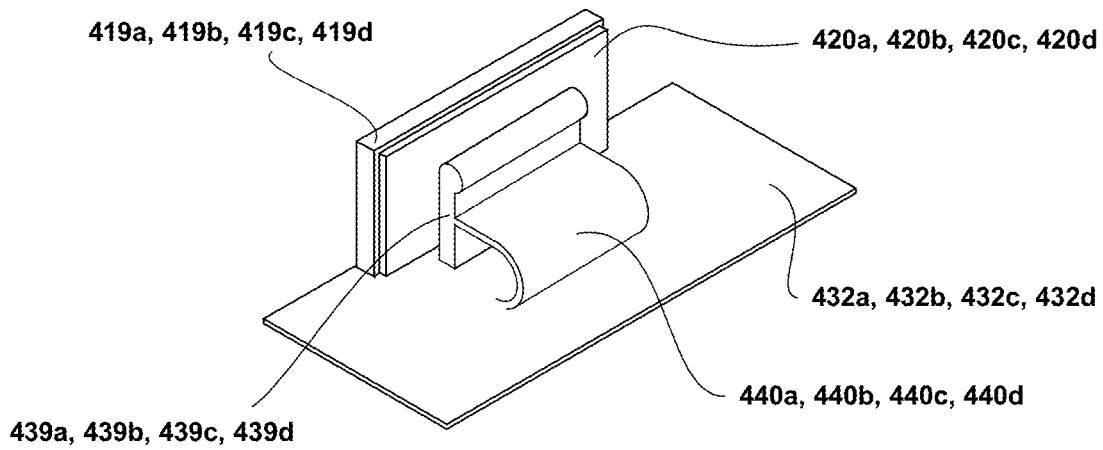
FIG. 35 is an isometric, three-dimensional view of the fifth version of screen clip design.

FIG. 35 is an isometric, three-dimensional view of the fifth version of screen clip 418a, 418b, 418c and 418d. The opposing walls 419a, 419b, 419c and 419d and 439a, 439b, 439c and 439d, plus the spring-like curved structure 440a, 440b, 440c and 440d and the base 432a, 432b, 432c and 432d can be made from all one-piece of material using injection molding, ideally from a plastic which an element of elasticity such as PLA, ABS, or from metal or another material with elastic properties. While metal could be used, plastic is preferential since it will not overheat when exposed to the heat generated by intense light such as sunlight. The materials may also be different for each component and adhered together, though making the clip all from one material in one piece is preferential

I claim:

1. A light and privacy shade for a screen of an electronic device comprising:
    a first panel having at least one junction side and one screen securing side;
    a second panel having at least one junction side and one screen securing side;
    a third panel having at least two junction sides and one screen securing side;
    a first hinge structure disposed along the at least one junction side of the first panel and one of the at least two junction sides of the third panel;

a second hinge structure disposed along the at least one junction side of the second panel and another of the at least two junction sides of the third panel;

screen clips attached to said screen securing side of each of said first, second and third panels, said screen clips having a plastic and/or rubberized clip interface for attaching to at least sides and a top of the screen.

2. The light and privacy shade of claim 1, wherein said screen clip is selected from the group consisting of plastic, metal, resin, rubber, neoprene, silicon and silicon rubber.

3. The light and privacy shade of claim 1, wherein the screen clip has a range of flexibility in the walls, providing a sprung pincer movement which allows it to clamp securely to screens that range from 0.02 to 1.0 inches thick or greater.

4. The light and privacy shade of claim 1, wherein the hinge structure comprises a flexible material.

5. The light and privacy shade of claim 4 wherein the flexible material is selected from the group consisting of vinyl, leather, synthetic leather, cotton, linen, cork, cardboard, paper, rubber, silicon rubber, polyethylene, plastic and polyurethane coated fabric.

6. The light and privacy shade of claim 1 wherein at least one of the first hinge structure and the second hinge structure comprises at least one hinge comprising a material selected from the group consisting of vinyl, leather, synthetic leather, cotton, linen, cork, cardboard, paper, rubber, silicon rubber, polyethylene, plastic and polyurethane coated fabric.

7. The light and privacy shade of claim 1 wherein at least one of the first, second and third panel comprises a material selected from the group consisting of polypropylene, multiply chipboard, cardboard, resin board, polyethylene, plastic, laminated sheet, cork, fabric and foam board.

8. The light and privacy shade of claim 1, wherein the at least one of the first, second and third panel is sized as 12×9 inches.

9. The light and privacy shade of claim 1, wherein the at least one of the first, second and third panel is sized as 14×10.5 inches.

10. The light and privacy shade of claim 1, wherein the first, second and third panel, when attached to a display screen, have substantially an inverted U-shape when viewed from the front.

11. The light and privacy shade of claim 1, wherein said first, second and third panels are covered on a first surface thereof by a first common fabric sheet, and wherein each of said hinge structures is formed by at least said first common fabric sheet.

12. The light and privacy shade of claim 11, wherein said first, second and third panels are covered on a second surface, opposite to said first surface, by a second common fabric sheet, and wherein each of said hinge structures is formed by at least said first and second fabric sheets.

13. The light and privacy shade of claim 1, further comprising a fourth panel having a junction side, wherein said third panel comprises a third junction side orthogonal to said first and second junction sides, wherein said fourth panel junction side is coupled to the third junction side of said third panel by a third hinge structure.

14. The light and privacy shade of claim 13, wherein said first, second, third and fourth panels are covered on a first surface thereof by a first common fabric sheet, and wherein each of said first, second and third hinge structures is formed by at least said first common fabric sheet.

15. The light and privacy shade of claim 13, wherein said first, second and fourth panels each has a securing structure that permits said fourth panel to be secured to each of said first and second panels.

16. The light and privacy shade of claim 15, wherein said securing structure comprises a flap on at least one of said first, second and fourth panels that overlaps a surface of an adjacent panel.

17. The light and privacy shade of claim 1, wherein said first and second panels comprise a surface side orthogonal to said at least one junction side, and wherein, when said shade is affixed to a screen of an electronic device resting on a planar work surface, said surface side also rests on said work surface.

18. The light and privacy shade of claim 1, wherein for at least one of said panels, said junction side is orthogonal to said screen securing side.

19. A combination of an electronic device having a display screen and the light and privacy shade as claimed in claim 1.

20. The light and privacy shade of claim 1, wherein said screen clip comprises a base, a first wall coupled and orthogonal to the base and a clipping structure coupled to the base that in combination with the first wall is operable to secure a screen, said clipping structure being selected from the group consisting of a second wall parallel to the first wall, a flexible S-shape member, a spiral shaped member, a curved structure and hinged structure.

21. A light and privacy shade for an electronic device, comprising a screen, that cannot stand upright of its own accord, said shade comprising:

a first panel having at least one junction side and one screen securing side;

a second panel having at least one junction side and one screen securing side;

a third panel having at least two junction sides;

a first hinge structure disposed along the at least one junction side of the first panel and one of the at least two junction sides of the third panel;

a second hinge structure disposed along the at least one junction side of the second panel and another of the at least two junction sides of the third panel; and clips attached to said electronic device securing side of said first and second panels, said clips having a clip interface for attaching to at least sides of the electronic device, wherein said first panel and said second panel serve as legs to support said shade on a surface.

* * * * *